(12) United States Patent
O'Sullivan et al.

(10) Patent No.: US 8,862,519 B2
(45) Date of Patent: Oct. 14, 2014

(54) PREDICTING EMAIL RESPONSE PATTERNS

(75) Inventors: Patrick Joseph O'Sullivan, Ballsbridge (IE); Edith Helen Stern, Yorktown Heights, NY (US); Robert Cameron Weir, Westford, MA (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 12/344,759

(22) Filed: Dec. 29, 2008

(65) Prior Publication Data

US 2010/0169264 A1    Jul. 1, 2010

(51) Int. Cl.
G06F 17/00    (2006.01)
G06F 17/20    (2006.01)
G06Q 10/10    (2012.01)

(52) U.S. Cl.
CPC ................................. *G06Q 10/10* (2013.01)
USPC ........................................................... 706/11

(58) Field of Classification Search
None
See application file for complete search history.

(56) References Cited

U.S. PATENT DOCUMENTS

| | | | |
|---|---|---|---|
| 7,409,423 B2* | 8/2008 | Horvitz et al. | 709/206 |
| 8,352,561 B1* | 1/2013 | Denise | 709/206 |
| 2004/0039630 A1* | 2/2004 | Begole et al. | 705/11 |
| 2004/0243679 A1* | 12/2004 | Tyler | 709/206 |
| 2004/0249776 A1* | 12/2004 | Horvitz et al. | 706/21 |
| 2008/0065736 A1* | 3/2008 | Gross | 709/207 |
| 2010/0017484 A1* | 1/2010 | Accapadi et al. | 709/206 |
| 2010/0211592 A1* | 8/2010 | Brownlee | 707/769 |

OTHER PUBLICATIONS

Daniel Avrahami and Scott E. Hudson. 2006. Responsiveness in instant messaging: predictive models supporting inter-personal communication. In Proceedings of the SIGCHI conference on Human Factors in computing systems (CHI '06), Rebecca Grinter, Thomas Rodden, Paul Aoki, Ed Cutrell, Robin Jeffries, and Gary Olson (Eds.). ACM, New York, NY, USA.*

Horvitz, Eric; Koch, Paul; Kadie, Carl M.; Jacobs, Andy. "Coordinate: probabilistic forecasting of presence and availability." UAI'02 Proceedings of the Eighteenth conference on Uncertainty in artificial intelligence (2002) pp. 224-233.*

Dabbish, L. A., Kraut, R. E., Fussell, S., & Kiesler, S. (Apr. 2005). Understanding email use: predicting action on a message. In Proceedings of the SIGCHI conference on Human factors in computing systems (pp. 691-700). ACM.*

* cited by examiner

*Primary Examiner* — Kakali Chaki
*Assistant Examiner* — Daniel Pellett
(74) *Attorney, Agent, or Firm* — Holland & Knight LLP; Brian J. Colandreo, Esq.; Jeffrey T. Placker, Esq.

(57) ABSTRACT

An email activity pattern of a user is analyzed. A time probability for the user to act on an email sent to the user is determined based upon, at least in part, the email activity pattern of the user.

21 Claims, 6 Drawing Sheets

PREDICTING EMAIL RESPONSE PATTERNS

BACKGROUND OF THE INVENTION

This disclosure relates to email systems, and more particularly to predicting response times for email communications.

Conventional messaging systems generally allow users to exchange email across a network. Email messages may be exchanged when individuals are connected or on-line. Often, users may send an email to an individual who is on-line and may expect the individual to receive the email almost instantaneously. Similarly, the user may send an email to an individual who is away, and the user may expect the individual to receive the email on returning. However, in the absence of the expectation that the individual will receive the email as expected, a user may prefer to try to reach the individual on the telephone, or instant messaging.

BRIEF SUMMARY OF THE INVENTION

In a first implementation, a method includes analyzing an email activity pattern of a user. A time probability for the user to act on an email sent to the user is determined based upon, at least in part, the email activity pattern. The time probability for the user to act on the email sent to the user is displayed on a computing device.

One or more of the following features may be included. Analyzing the email activity pattern of the user may include determining a previous time for the user to act on a previous email. Analyzing the email pattern of the user may include determining a change in time for the user to act on a plurality of previous emails. The email activity pattern of the user may be based upon, at least in part, a work schedule of the user.

The time probability for the user to act on an email sent to the user may include the time probability for the user to read the email. The time probability for the user to act on an email sent to the user may include the time probability for the user to respond to the email.

Determining the time probability for the user to act on an email sent to the user may be based upon, at least in part, timing of the email sent to the user. Determining the time probability for the user to act on an email sent to the user may include determining an inbox status for the user. Determining the time probability for the user to act on an email sent to the user may be based upon, at least in part, an attribute of the email In another implementation, a computer program product includes a computer readable medium having a plurality of instructions stored on it. When executed by a processor, the instructions cause the processor to perform operations including analyzing an email activity pattern of a user. A time probability for the user to act on an email sent to the user is determined based upon, at least in part, the email activity pattern. The time probability for the user to act on the email sent to the user is displayed on a computing device.

One or more of the following features may be included. The instructions for analyzing the email activity pattern of the user may include instructions for determining a previous time for the user to act on a previous email. The instructions for analyzing the email pattern of the user may include instructions for determining a change in time for the user to act on a plurality of previous emails. The email activity pattern of the user may be based upon, at least in part, a work schedule of the user.

The time probability for the user to act on an email sent to the user may include the time probability for the user to read the email. The time probability for the user to act on an email sent to the user may include the time probability for the user to respond to the email.

Determining the time probability for the user to act on an email sent to the user may be based upon, at least in part, timing of the email sent to the user. The instructions for determining the time probability for the user to act on an email sent to the user may include instructions for determining an inbox status for the user. Determining the time probability for the user to act on an email sent to the user may be based upon, at least in part, an attribute of the email.

In still another implementation, a computing system includes at least one processor and at least one memory architecture coupled with the at least one processor. A first software module is executed on the at least one processor and the at least one memory architecture, and is configured analyze an email activity pattern of a user. A second software module is executed on the at least one processor and the at least one memory architecture, and is configured to determine, based upon, at least in part, the email activity pattern, a time probability for the user to act on an email sent to the user. A third software module is executed on the at least one processor and the at least one memory architecture, and is configured to display the time probability for the user to act on the email sent to the user on a computing device.

The first software module may be further configured to determine a previous time for the user to act on a previous email The details of one or more implementations are set forth in the accompanying drawings and the description below. Other features will become apparent from the description, the drawings, and the claims.

DETAILED DESCRIPTION OF THE INVENTION

Figure 1:
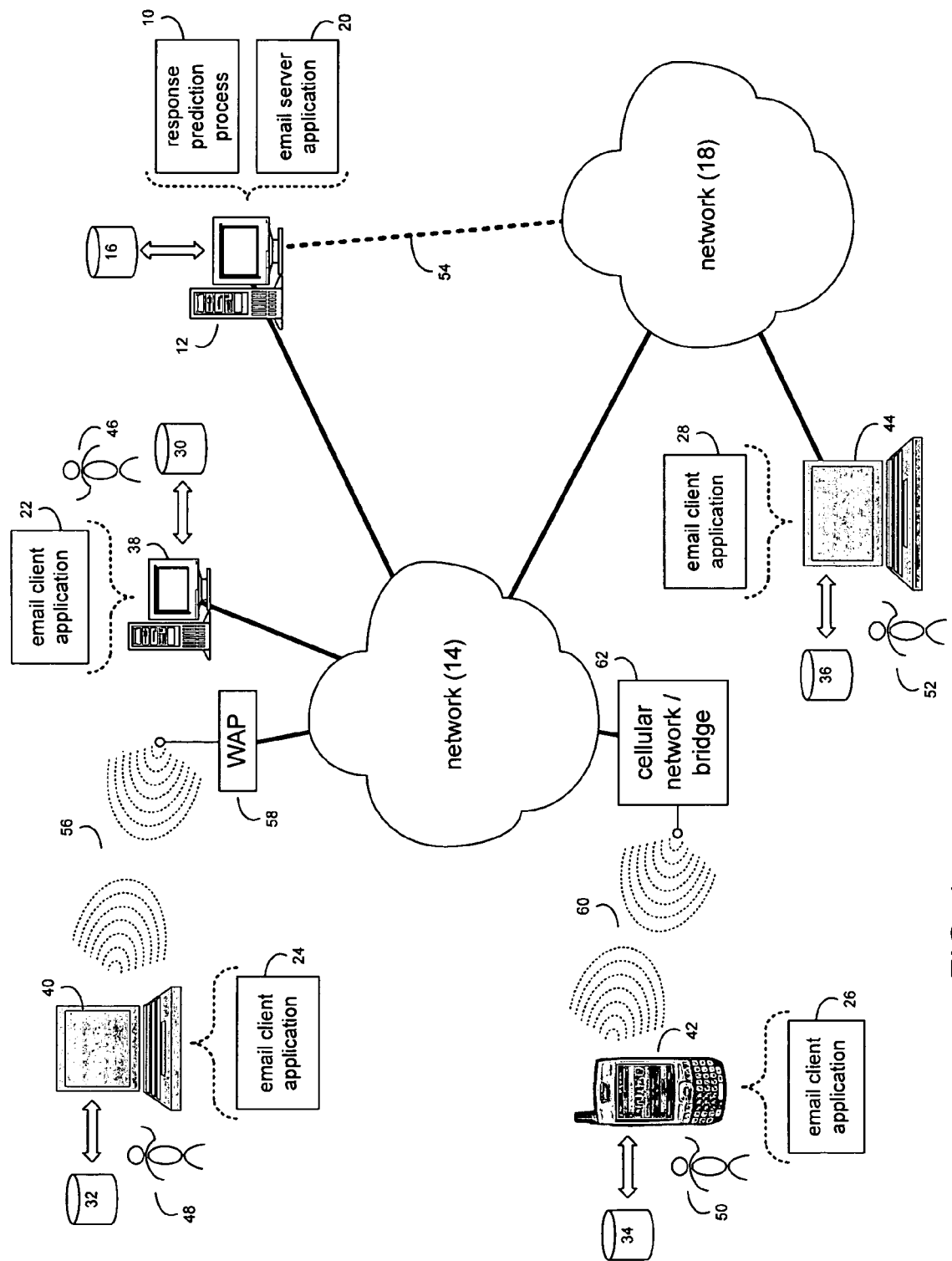
FIG. 1 diagrammatically depicts a response prediction process and an email system coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1, there is shown response prediction process 10 that may reside on and may be executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® XP Server; Novell® Netware®; or Red Hat® Linux®, for example (Microsoft and Windows are registered trademarks of Microsoft Corporation in the United States, other countries, or both; Novell and NetWare are registered trademarks of Novell Corporation in the United States, other countries, or both; Red Hat is a registered trademark of Red Hat Corporation in the United States, other countries, or both; and Linux is a registered trademark of Linus Torvalds in the United States, other countries, or both). In addition, as an alternative, response prediction process may reside on and may be executed by one or more client electronic devices, such as a personal computer, notebook computer, personal digital assistant, and data enabled cellular phone, for example.

As will be discussed below in greater detail, response prediction process 10 may analyze an email activity pattern of a user. A time probability for the user to act on an email sent to the user may be determined based upon, at least in part, the email activity pattern of the user relative to a sender. The time probability for the user to act on the email sent to the user may be displayed on a computing device.

The instruction sets and subroutines of response prediction process 10, which may include one or more software modules and which may be stored on storage device 16 coupled to client computer 12, may be executed by one or more processors (not shown) and one or more memory architectures (not shown) incorporated into client computer 12. Storage device 16 may include but is not limited to: a hard disk drive; a solid state drive; a tape drive; an optical drive; a RAID array; a random access memory (RAM); and a read-only memory (ROM).

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other Countries, or both). Network 14 may be connected to one or more secondary networks (e.g., network 18), examples of which may include but are not limited to: a local area network; a wide area network; or an intranet, for example.

Server computer 12 may execute one or more email server applications (e.g., email server application 20), examples of which may include but are not limited to, e.g., Lotus® Domino® Server and Microsoft Exchange Server® (Lotus and Domino are registered trademark of International Business Machines Corporation in the United States, other countries, or both; and Exchange Server is a registered trademark of Microsoft Corporation in the United States, other countries, or both). Email server application 20 may interact with one or more email client applications (e.g., email client applications 22, 24, 26, 28) for routing and managing email communications. Examples of email client applications 22, 24, 26, 28 may include, but are not limited to, e.g., Lotus Notes® and Microsoft Outlook® (Lotus Notes is a registered trademark of International Business Machines Corporation in the United States, other countries, or both; and Outlook is a registered trademark of Microsoft Corporation in the United States, other countries, or both). Response prediction process 10 may be a stand-alone application that interfaces with email server application 20 or may be an applet/application that is executed within email server application 20.

The instruction sets and subroutines of email server application 20, which may be configured as one or more software modules, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the response prediction process may be a client-side application (not shown) residing on a storage device (e.g., stored on storage devices 30, 32, 34, 36, respectively) of one or more client electronic devices 38, 40, 42, 44. As such, the response prediction process may be a stand-alone application that interfaces with an email client application (e.g., scheduling client applications 22, 24, 26, 28), or may be an applet/application that is executed within an email client application. As such, the response prediction process may be a client-side process, a server-side process, or a hybrid client-side/server-side process, which may be executed, in whole or in part, by server computer 12, or one or more of client electronic devices 38, 40, 42, 44.

The instruction sets and subroutines of email client applications 22, 24, 26, 28, which may be configured as one or more software modules, and which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using email client applications 22, 24, 26, 28, users 46, 48, 50, 52 may send, receive, manage, etc., email communications. Sending, receiving, and managing email communications may include accessing and/or interacting with scheduling server application 20.

Users 46, 48, 50, 52 may access email server application 20 directly through the device on which the email client application (e.g., email client applications 22, 24, 26, 28) is executed, namely client electronic devices 38, 40, 42, 44, for example. Users 46, 48, 50, 52 may access email server application 20 directly through network 14 or through secondary network 18. Further, server computer 12 (i.e., the computer that executes email server application 20) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or a custom operating system (Windows CE is a registered trademark of Microsoft Corporation in the United States, other countries, or both).

For the purpose of the following description, email client application 22 may be discussed. However, this is for illustrative purposes only and should not be construed as a limitation of the present disclosure, as other email client applications (e.g., email client applications 24, 26, 28) may be equally utilized.

Figure 2:
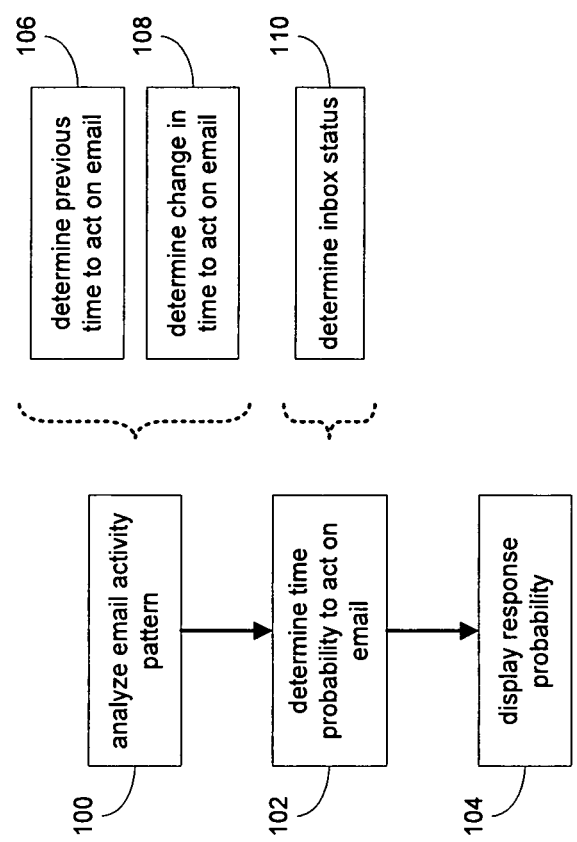
FIG. 2 is a flowchart of a process executed by the response prediction process of FIG. 1.

Referring also to FIG. 2, response prediction process 10 generally may analyze 100 an email activity pattern of a user. Response prediction process 10 may also determine 102 a time probability for the user to act on an email sent to the user. The time probability for the user to act on the email sent to the user may be based upon, at least in part, the email activity pattern of the user. The time probability for the user to act on the email sent to the user may be displayed 104 on a computing device As such, response prediction process 10 may provide a probabilistic time for the user to act on an email sent to the user.

Figure 3:
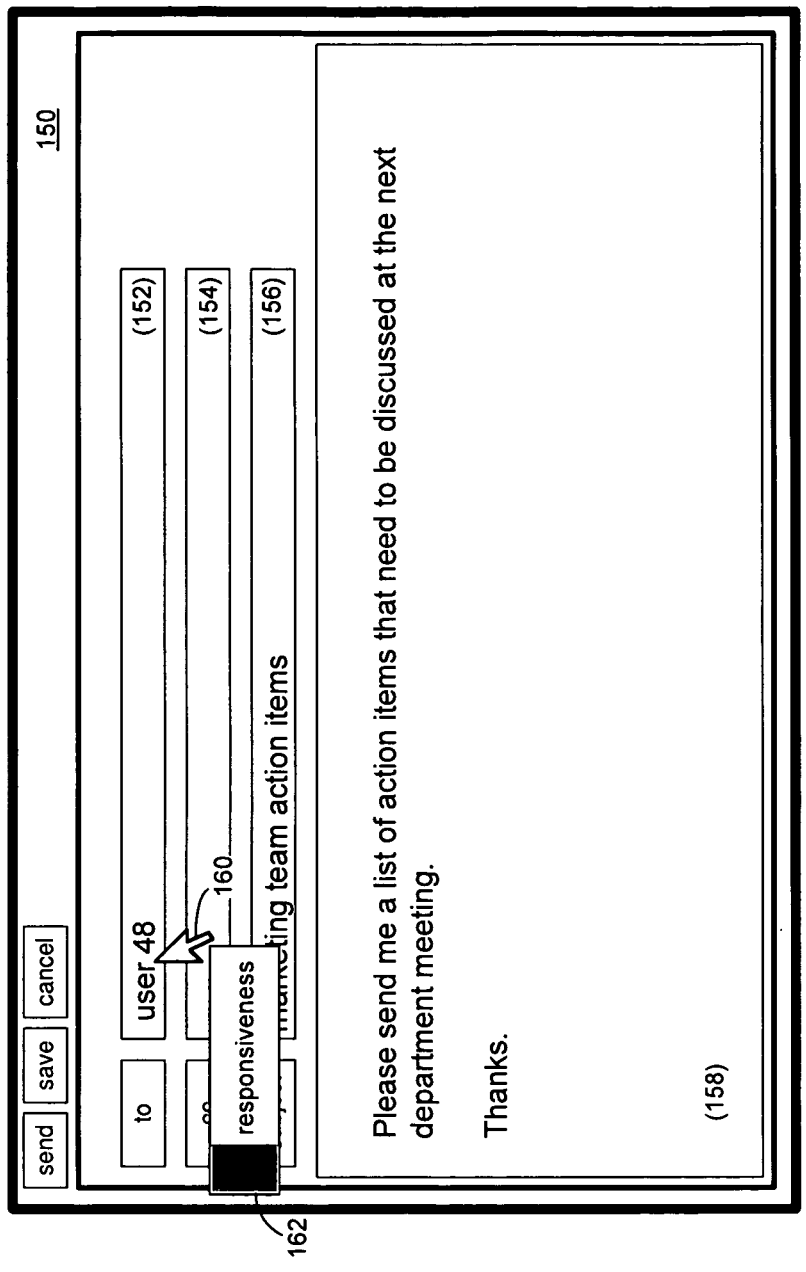
FIG. 3. is an email composition user interface that may be rendered by the email system of FIG. 1.

For example, and referring also to FIG. 3, utilizing email client application 22, user 46 may compose email 150. Email 100 may be addressed to user 48, e.g., in "to" field 152. Additional recipients of email 150 may be included, e.g., in "to" field 152 and/or as carbon copy recipients, e.g., in "cc" field 154. Additionally, email 150 may include an indicator of the subject of the email, e.g., which may be provided in subject field 156. Additionally, content of the email may be provided in email body 158.

Before sending email 150, user 46 may wish to determine how responsive user 48 is to email. For example, the subject matter of email 150 may be time sensitive, etc. Accordingly, user 46 may select user 48 in to field 152, e.g., by positioning onscreen pointer 160 (e.g., which may be controlled by a pointing device, such as a mouse; not shown) over "user 48" in to field 152 and right-clicking. In response to selecting user 48 in to field 152, response prediction process 10 (alone or in conjunction with one or more of email client application 22 and/or email server application 20) may render menu 162. While menu 162 is shown only including a single option (i.e., "responsiveness") this is for illustrative purposes only, and should not be construed as a limitation of the present disclosure as the number and nature of options included within menu 162 may vary according to design criteria and user need.

User 46 may select, via onscreen pointer 160, "responsiveness" from within menu 162, resulting in response prediction process 10 analyzing 100 an email activity pattern of user 48. Analyzing 100 the email activity pattern of user 48 may include determining 106 a previous time for user 48 to act on one or more previous emails. For example, information regarding user 48's email activity may be logged by one or more of response prediction process 10, email server application 20, and email client application 24. Information regarding user 48's email activity may include, but is not limited to, for example, how often user 48 is logged onto email client application 24 and/or email server application 20, the number of emails received by user 48 (e.g., over a predetermined period of time), amount of time between receipt of an email and user 48 reading the email (e.g., as evidenced by user 48 opening the email), amount of time between reading an email and replying to the email (e.g., which may include the amount of time between reading an email and replying to the email for email received from all senders and for email received from a particular sender, such as user 46), as well as various additional/alternative information.

Additionally/alternatively, analyzing 100 the email pattern of the user may include determining 108 a change in time for the user to act on a plurality of previous emails. As mentioned above, email patterns for a user may vary depending upon whom the email is from (i.e., the sender of the email). Analyzing 100 the email pattern of the user may include analyzing 100 the email pattern for all senders and may also include analyzing 100 the email pattern for a particular sender. While the email pattern for a particular sender may be especially relevant, if the particular sender communicates with the user via email relatively infrequently (or has not previously communicated with the user via email), or it has been a relatively long time since the particular sender has communicated with the user via email, etc., it may be useful to additionally/alternatively analyze 100 the email pattern of the user for all senders.

For the purpose of the following example, it may be assumed that user 46 may communicate relatively frequently (e.g., daily or several times a day) with user 48 via email. Based upon, at least in part, the logged information regarding user 48's email activity with respect to user 46, response prediction process 10 may determine that the average time for user 48 to read an email (e.g., from the time that the email is received by email server application 20 until the time that user 48 opens the email, e.g., via email client application 24) sent by user 46 may be forty-seven minutes. Further, based upon, at least in part, the logged information regarding user 48's email activity, response prediction process 10 may determine that the average time for user 48 to respond to an email (e.g., from the time that user 48 opens the email until the time that user 48 sends a response to the email) from user 46 may be thirteen minutes.

Additionally, based upon, at least in part, the logged information regarding user 48's email activity, response prediction process 10 may determine that the average time for user 48 to read an email (e.g., from the time that the email is received by email server application 20 until the time that user 48 opens the email, e.g., via email client application 24) sent by user 46 over the last week may be ninety-three minutes. Further, based upon, at least in part, the logged information regarding user 48's email activity, response prediction process 10 may determine that the average time for user 48 to respond to an email (e.g., from the time that user 48 opens the email until the time that user 48 sends a response to the email) sent by user 46 over the last week may be fifteen minutes.

Accordingly, based upon the determined 106 previous time to act on one or more previous emails from user 46, response prediction process 10 may determine 108 that there has been a change in user 48's time to act on an email sent by user 46. Namely, over the last week the average time for user 48 to read an email sent by user 46 may have been about twice as long as user 48's long term average. However, over the last week the average time for user 48 to respond to an email sent by user 46 may have been only slightly longer that user 48's long term average. As such, response prediction process may determine 108 a change in time for user 48 to act on a plurality of emails sent by user 46 over the last week.

Similarly, a determined 106 previous time to act on one or more previous emails from user 46 may indicate that user 48 may have a history of responding to email from user 46 immediately upon opening the email. For example, user 48 may have a history of responding to email from user 46 as soon as user 48 opens the email from user 46. However, in the last three weeks user 48 may have begun opening email from user 46, and then dismissing it for a period of time (e.g., closing the email). User 48 may respond to the email from user 46 at a later time (e.g., as opposed to immediately). As such, response prediction process 10 may determine that there has been a change in user 48's time to act on email from user 46.

The email activity pattern of the user may be based upon, at least in part, a work schedule of the user. The work schedule of the user may be based upon a predefined work schedule (e.g., which may be defined within a data store, such as a human resources database, not shown) and/or may be based upon a determined work schedule. For example, response prediction process 10 may determine 106 a previous time for user 48 to act on one or more previous emails, as described above. However, in determining 106 a previous time for user 48 to act one or more previous emails may take into consideration time of day and day of the week. For example, response prediction process 10 may determine 106 an average time to read an email (e.g., sent by user 46 and/or by all senders) received by user 48 to be twenty minutes on Monday through Friday during the hours of 8:00 am and 5:00 pm. Additionally, response prediction process 10 may determine 106 an average time to read an email received by user 48 to be one hundred eighty minutes on Saturday and Sunday and on Monday through Friday during the hours of 5:00 pm and 8:00 am. Accordingly, a work schedule including Monday through Friday during the hours of 8:00 am and 5:00 pm may be determined to be a work schedule for user 48 based upon, at least in part, a shorter average time to read an email by user 48 during this time period.

In a similar manner, response prediction process 10 may discern other patterns. For example, user 48 may have a history of not responding to email during the first week of the month of August. Accordingly, response prediction process 10 may determine that the first week of August is a vacation week for user 48. Further, response prediction process may analyze 100 the email pattern for user 48 and determine that generally, if user 48 does not read an email for three days, user 48 is unlikely to read the email for up to seven days. Accordingly, response prediction process 10 may similarly determine that, if user 48 has not read an email for three days, and is therefore statistically unlikely to read the email for seven days, user 48 may likely be on vacation.

Figure 4:
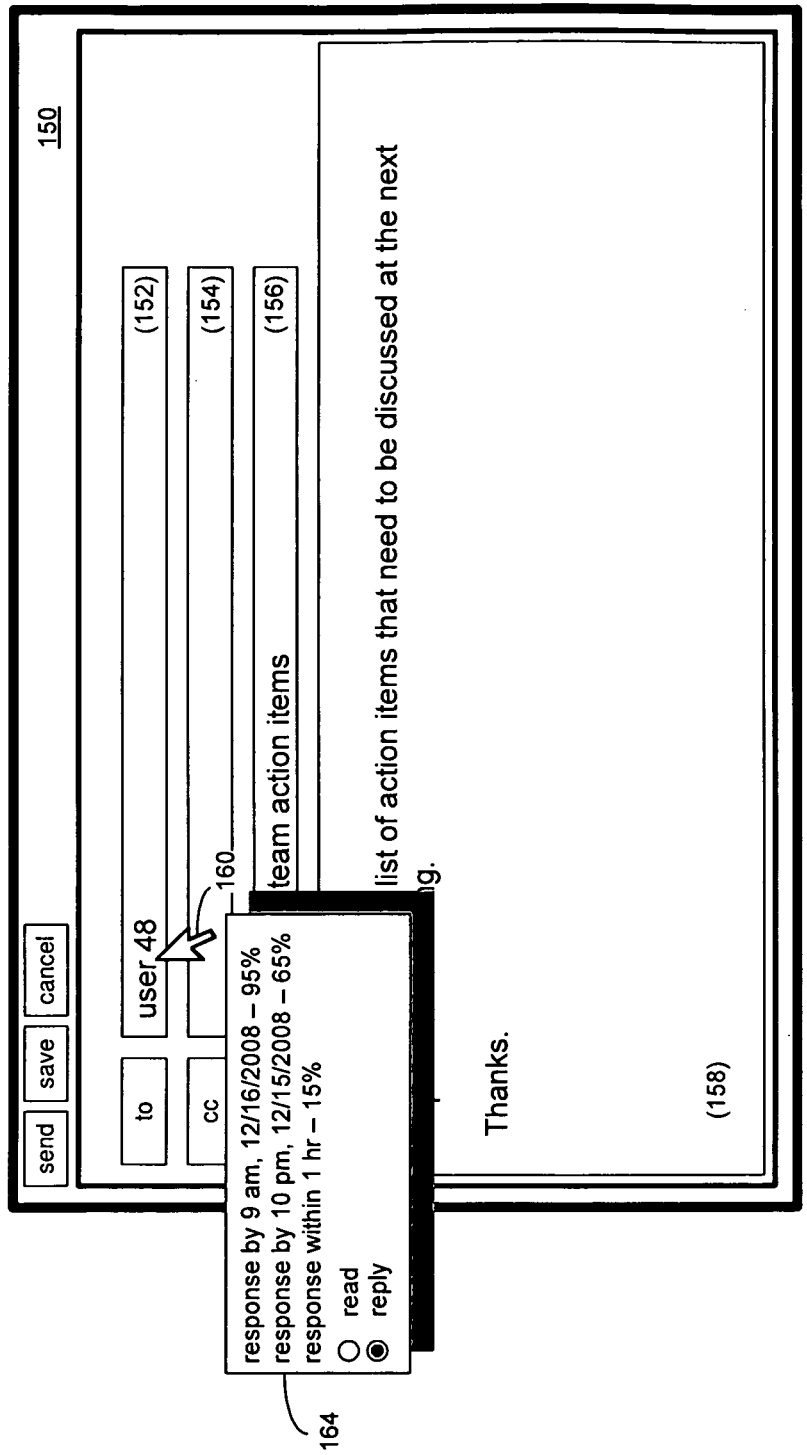
FIG. 4 is an email composition user interface that may be rendered by the email system of FIG. 1.

Response prediction process 10 may determine 102 a time probability for the user to act on an email sent to the user, and may display 104 the time probability for the user to act on the email sent to the user on a computing device (e.g., a client electronic device). Continuing with the above stated example, and referring also to FIG. 4, in response to user 46 selecting "responsiveness" from within menu 162, and upon analyzing 100 the email activity pattern of user 48, response prediction process 10 (alone or in conjunction with one or more of email client application 22 and/or email server application 20) may display a response probability for user 48 via responsiveness summary 164. While responsiveness summary 164 is shown including percentage probabilities for user 48 responding to an email (namely "response by 9 am 6/16/2008—95%", "response by 10 pm 6/15/2008—65%", and "response within 1 hr—15%"), this is intended for illustrative purposes only and should not be construed as a limitation of the present disclosure as other modes of displaying time probability for user 48 to act on an email sent to the user may be equally utilized.

The time probability for the user to act on an email sent to the user may include the time probability for the user to read the email and/or for the user to respond to the email. For example, as shown, responsiveness summary 164 may include the options "read" and "reply". Depending upon the information desired by user 46, user 46 may select, e.g., via onscreen pointer 160, "read" option and/or "reply" option (of which the "reply" option has been selected in the illustrated example). Accordingly, in the illustrated example, the time probability for user 48 to reply to an email sent to user 48 by user 46 may be displayed 104 on client electronic device 38, e.g., in responsiveness summary 164. In addition/as an alternative to options that may be selected from within responsiveness summary 164, the options "read" and "reply" may be selected, for example, from menu 162 when user 46 originally requested the time probability for user 48 to respond to an email. Further, the options "read" and "reply" may be selected via other known options settings, e.g., for email client application 22, email server application 20, and/or a user interface associated with response prediction process 10.

As discussed above, response prediction process 10 may determine 106 a previous time for the user to act on one or more previous emails (e.g., from user 46 in particular or from all senders). Further, determining 106 the previous time for the user to act on one or more previous emails may include determining a previous time for the user to act on one or more previous emails depending upon time of day (e.g., as described above with reference to a work schedule of the user). Accordingly, determining the time probability for the user to act on an email sent to the user may be based upon, at least in part, timing of the email sent to the user. Continuing with the above-stated example, in which user 46 may be trying to send user 48 an email at 8:00 pm on Monday, Dec. 15, 2008. Based upon user 48's average response time of one hundred eighty minutes for email after 5:00 pm on weekdays, response prediction process 10 may determine 102 a time probability of 15% that user 48 will respond within one hour, and may determine 102 a time probability of 65% that user 48 will respond by 10:00 pm (i.e. the same night). Further, based upon user 48's average response time of twenty minutes for email between 8:00 am and 5:00 pm on weekdays, response prediction process 10 may determine 102 a time probability of 95% that user 48 will respond by 9:00 am on Tuesday, Dec. 16, 2008 (i.e., the next business day after user 46 sends the email).

In addition/as an alternative to determining a time probability for the user to act on an email based upon the time of day that the email is sent, response prediction process 10 may determine 102 the time probability for the user to act on an email sent to the user may be based upon, at least in part, timing of the email sent to the user in the context of contemporaneous events. For example, response prediction process 10 may access a calendaring/scheduling data store for user 48 (e.g., which may be maintained by email server application 20 and/or email client application 24, both of which may incorporate calendaring/scheduling functionality). Based on accessing calendaring/scheduling information relative to user 48, response prediction process 10 may determine that user 48 is currently in a meeting that is scheduled to last for an additional three hours. As such, response prediction process 10 may determine 102 a time probability that user 48 will act on an email based upon, at least in part, user 48 being in a meeting for the next three hours. Determining 102 a time probability that the user will act on an email may be based upon, at least in part, various additional/alternative time-wise considerations.

Determining the time probability for the user to act on an email sent to the user may include determining an inbox status for the user. Continuing with the above-stated example, response prediction process 10 may determine 106 a previous time to act on one or more previous emails of twenty minutes on weekdays from 8:00 am through 5:00 pm. However, response prediction process 10 may determine 110 an inbox status for user 48, which may include, for example, determining the number of unopened emails, the amount of time since an email was last open, the priority of unopened emails with user 48's inbox, and the like. Assume for example that response prediction process 10 determines 110 an inbox status for user 48, in which user 48's inbox includes fifty emails, and that the last email was opened two hours ago. Based upon, at least in part, the determined 110 status of user 48's inbox, and the analyzed 100 email activity pattern for user 48 (e.g., including a determined 106 previous average time to act on email of twenty minutes), response prediction process 10 may decrease the probability that user 48 will act on an email consistent with the analyzed 100 email activity pattern. For example, and as generally discussed above, if user 48 has not opened any emails in the last three days, it may be statistically unlikely (e.g., based on a pattern of email activity) that user 48 will open any email for up to seven days, being indicative of user 48 being on vacation.

Further, determining 102 the time probability for the user to act on an email sent to the user may be based upon, at least in part, an attribute of the email. Attributes of the email may include a priority status of the email, a sender of the email, a length of the email, and the like. For example, as discussed above, response prediction process may analyze 100 an email activity pattern for user 48 in which user 48 may have an average response time to email of twenty minutes during the "work day." However, this average may be an average for all email. As discussed above, user 48 may have a quicker or slower response time for specific senders (e.g., user 48 may respond quickly to email form user 48's supervisor, but more slowly to emails from user 48's peers). Similarly, user 48 may have a quicker average response time for email designated as high priority. Accordingly, user 46 may designate email 150 as high priority (e.g., using standard email priority designation interface, not shown). Response prediction process 10 may determine 102 a time probability for user 48 to act on email 150 based upon, at least in part, the high priority designation, of five minutes, for example. The determined 102 time probability for user 48 to act on a high priority email may be based upon, at least in part, an analyzed email activity pattern for user 48 with respect to high priority email.

While the preceding description generally relates to accessing response prediction process 10 via email 150 that user 46 may compose, response prediction process 10 may be accessed through alternative means. Examples of such alternative means may include, but is not limited to, accessing response prediction process through a main email user interface, including user interface control associated with the email itself (e.g., such that when a sent email is opened the response probability may be displayed, e.g., as a header or the like), as well as various additional/alternative means.

Figure 5:
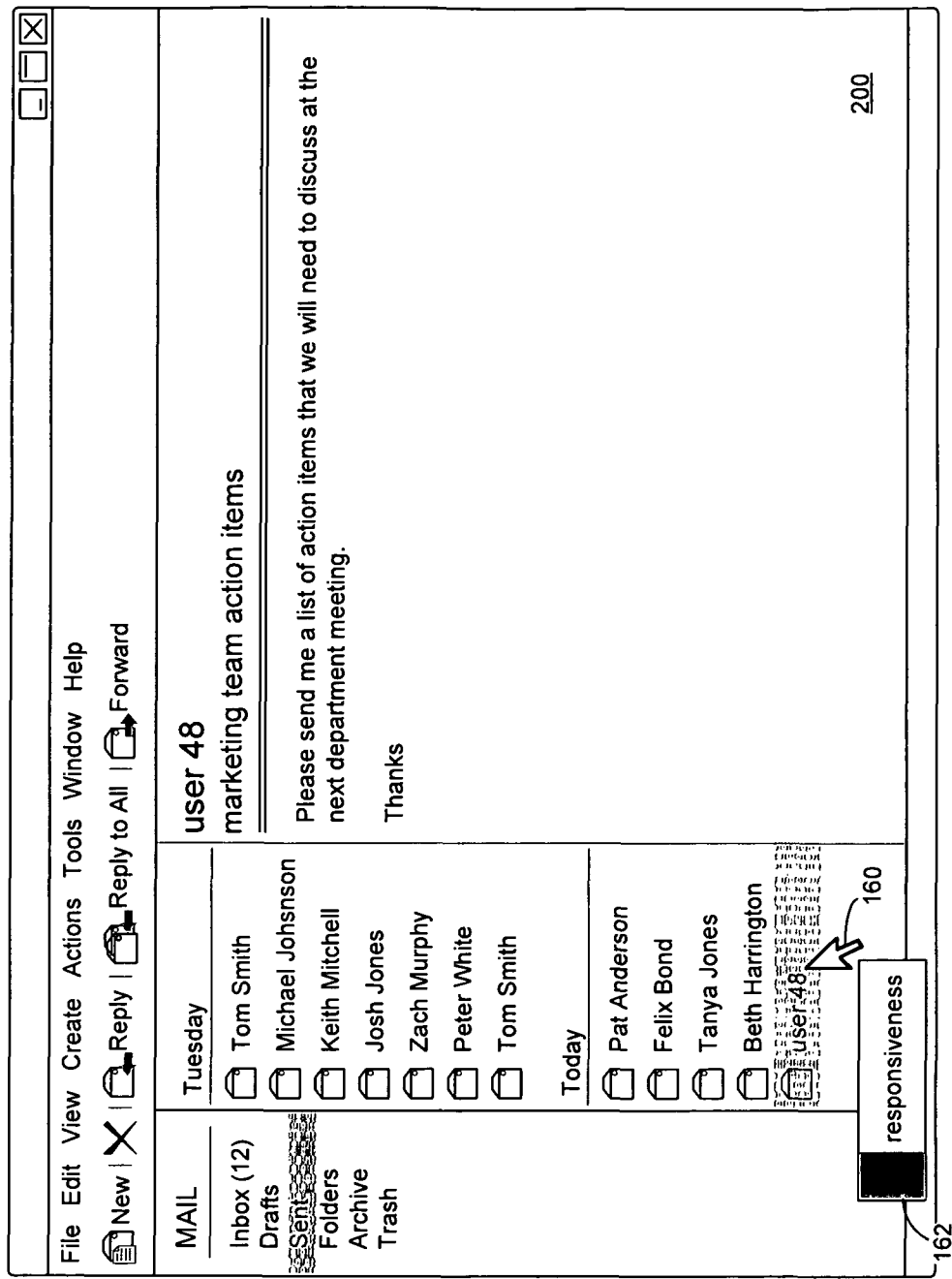
FIG. 5 is an email client application user interface that may be rendered by the email system of FIG. 1.
Figure 6:
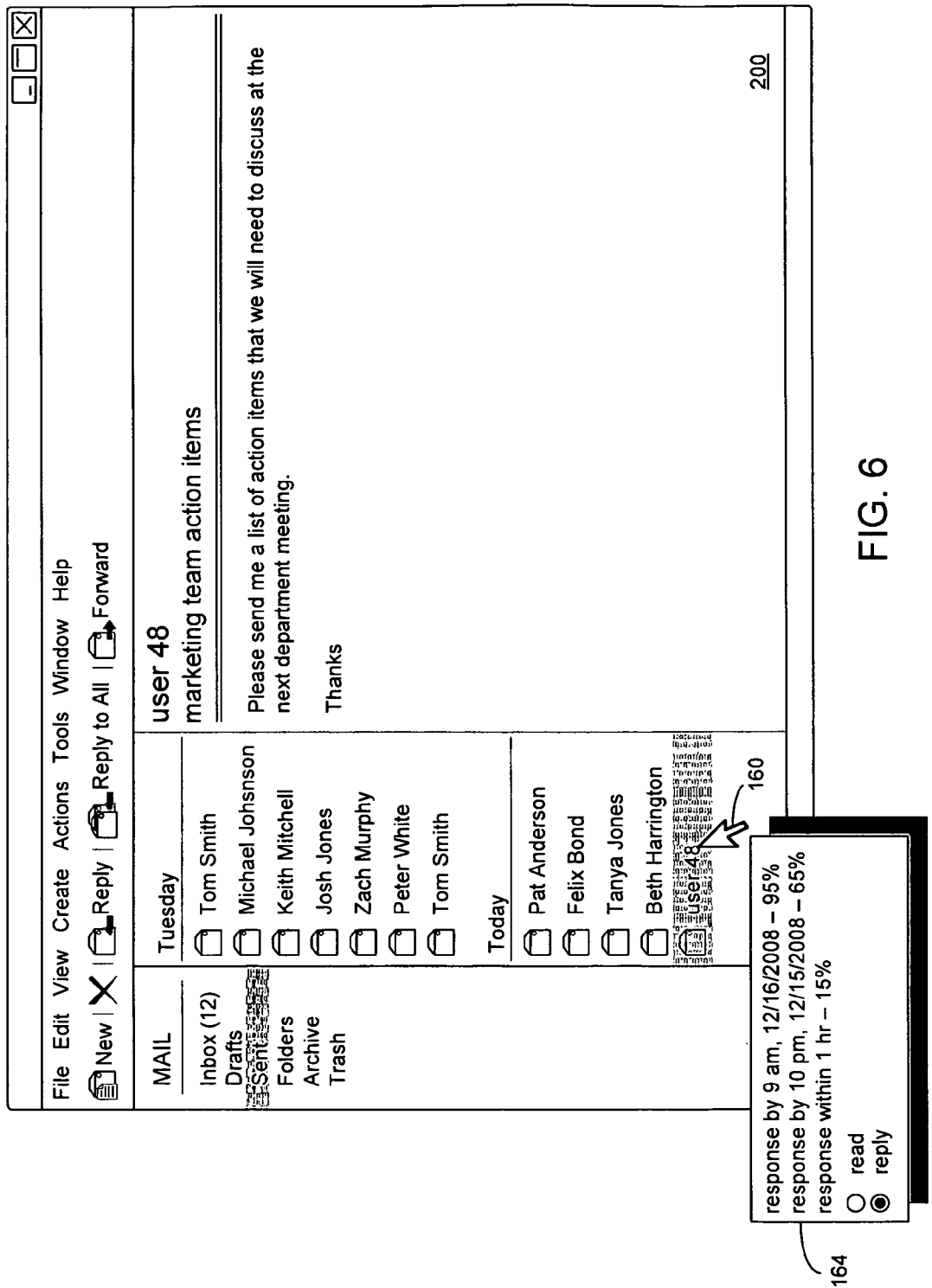
FIG. 6 is an email client application user interface that may be rendered by the email system of FIG. 1.

Referring also to FIGS. 5 and 6, user 46 may access response prediction process via email user interface 200. For example, email user interface 200 may include one or more electronic mailboxes, such as an "Inbox," "Drafts," "Sent," and the like. User 46's "Sent" mailbox may include a plurality of emails that have been sent by user 46, e.g., which may be displayed in email user interface 200. In a similar fashion as described above, user 46 may select, via onscreen pointer 160, an electronic mail sent to a user (e.g., user 48) and may, e.g., right-click the pointing device. Right-clicking on the email to user 48 may result in response prediction process 10 (alone or in conjunction with email client application 22 and/or email server application 20) rendering menu 162, including the option "responsiveness." User 46 may select the option "responsiveness" from within menu 162. Selecting the option "responsiveness" may result in response prediction process 10 (alone or in conjunction with email client application 22, email client application 24, and/or email server application 20) analyzing 100 an email activity pattern of user 48, and determining 102, based upon, at least in part, the email activity pattern, a time probability for user 48 to act on the email sent to user 48, as described above. Further, response prediction process 10 (alone or in conjunction with email client application 22 and/or email server application 20) may display the time probability for user 48 to act on the email sent to user 48 on a computing device (e.g., client electronic device 38) by rendering responsiveness summary 164 in email user interface 200.

For the convenience of description, the above examples have pertained to the time probability for a user to act on an email, in which the email included only a single recipient. As such, only a single set of response probability information was described. It should be understood that for an email including multiple recipients (e.g., multiple "to" recipients, "cc" recipients, and/or "bcc" recipients) that a response time probability may be determined for one, some, and/or all of the multiple recipients. The response time probability for the various recipients may be displayed together (e.g., in a single responsiveness summary) and/or may be individually accessed (e.g., by selecting individual recipients from the "to" field of the email). Various additional/alternative features and embodiments will be understood.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   receiving, by a computing device, a selection of a user from at least one recipient of a drafted email before the drafted email is sent;
   determining, by the computing device, an email activity pattern of the user by analyzing a plurality of factors associated with an email inbox of the user including analyzing email activity of the user with a plurality of senders;
   determining, by the computing device, based upon, at least in part, the email activity pattern, a time probability for the user to act on an email sent to the user, wherein determining the time probability for the user to act on the email sent to the user is based upon, at least in part, timing of the email sent to the user and the email activity of the user with the plurality of senders, wherein the time probability for the user to act on the email sent to the user is determined for a plurality of time periods; and
   displaying, by the computing device, the plurality of time periods and associated time probabilities for the user to act on the email sent to the user on a computing device via a pop-up from the drafted email, wherein the pop-up includes a read option and a reply option to filter displayed results based upon, at least in part, the time probability for the user to read the email and the time probability for the user to reply to the email;
wherein the time probability includes the plurality of time periods and a probability of the user responding to an email within each of the plurality of time periods.

2. The method of claim 1, wherein the plurality of factors includes determining a previous time for the user to act on one or more previous emails.

3. The method of claim 1, wherein the plurality of factors includes determining a change in time for the user to act on a plurality of previous emails.

4. The method of claim 1, wherein at least one of the plurality of factors is based upon, at least in part, a work schedule of the user.

5. The method of claim 1, wherein the time probability for the user to act on the email sent to the user is the time probability for the user to read the email.

6. The method of claim 1, wherein the time probability for the user to act on the email sent to the user is the time probability for the user to respond to the email.

7. The method of claim 1, wherein determining the time probability for the user to act on the email sent to the user comprises determining an inbox status for the user.

8. The method of claim 1, wherein determining the time probability for the user to act on the email sent to the user is based upon, at least in part, an attribute of the email.

9. The method of claim 1, wherein the timing of the email sent to the user includes a time of day.

10. A computer program product comprising a computer readable medium having a plurality of instructions stored thereon, which, when executed by a processor, cause the processor to perform operations comprising:
receiving a selection of a user from at least one recipient of a drafted email before the drafted email is sent;
determining an email activity pattern of the user by analyzing a plurality of factors associated with an email inbox of the user including analyzing email activity of the user with a plurality of senders;
determining, based upon, at least in part, the email activity pattern, a time probability for the user to act on an email sent to the user, wherein determining the time probability for the user to act on the email sent to the user is based upon, at least in part, timing of the email sent to the user and the email activity of the user with the plurality of senders, wherein the time probability for the user to act on the email sent to the user is determined for a plurality of time periods; and
displaying the plurality of time periods and associated time probabilities for the user to act on the email sent to the user on a computing device via a pop-up from the drafted email, wherein the pop-up includes a read option and a reply option to filter displayed results based upon, at least in part, the time probability for the user to read the email and the time probability for the user to reply to the email;
wherein the time probability includes the plurality of time periods and a probability of the user responding to an email within each of the plurality of time periods.

11. The computer program product of claim 10, wherein the plurality of factors includes determining a previous time for the user to act on one or more previous emails.

12. The computer program product of claim 10, wherein the plurality of factors includes determining a change in time for the user to act on a plurality of previous emails.

13. The computer program product of claim 10, wherein at least one of the plurality of factors is based upon, at least in part, a work schedule of the user.

14. The computer program product of claim 10, wherein the time probability for the user to act on the email sent to the user is the time probability for the user to read the email.

15. The computer program product of claim 10, wherein the time probability for the user to act on the email sent to the user is the time probability for the user to respond to the email.

16. The computer program product of claim 10, wherein the instructions for determining the time probability for the user to act on the email sent to the user comprise instructions for determining an inbox status for the user.

17. The computer program product of claim 10, wherein determining the time probability for the user to act on the email sent to the user is based upon, at least in part, an attribute of the email.

18. The computer program product of claim 10, wherein the timing of the email sent to the user includes a time of day.

19. A computing system comprising:
at least one processor;
at least one memory architecture coupled with the at least one processor;
a first software module executed on the at least one processor and the at least one memory architecture, wherein the first software module is configured to receive a selection of a user from at least one recipient of a drafted email before the drafted email is sent;
a second software module executed on the at least one processor and the at least one memory architecture, wherein the second software module is configured to determine an email activity pattern of the user by analyzing a plurality of factors associated with an email inbox of the user including analyzing email activity of the user with a plurality of senders;
a third software module executed on the at least one processor and the at least one memory architecture, wherein the third software module is configured to determine, based upon, at least in part, the email activity pattern, a time probability for the user to act on an email sent to the user, wherein the second software module is configured to determine the time probability for the user to act on the email sent to the user is based upon, at least in part, timing of the email sent to the user and the email activity of the user with the plurality of senders, wherein the second software module is configured to determine the time probability for the user to act on the email sent to the user for a plurality of time periods; and
a fourth software module executed on the at least one processor and the at least one memory architecture, wherein the fourth software module is configured to display the plurality of time periods and associated time probabilities for the user to act on the email sent to the user on a computing device via a pop-up from the drafted email, wherein the pop-up includes a read option and a reply option to filter displayed results based upon, at least in part, the time probability for the user to read the email and the time probability for the user to reply to the email;
wherein the time probability includes the plurality of time periods and a probability of the user responding to an email within each of the plurality of time periods.

20. The computing system of claim 19, wherein the plurality of factors includes determining a previous time for the user to act on one or more previous emails.

21. The computing system of claim 19, wherein the timing of the email sent to the user includes a time of day.

* * * * *